(12) United States Patent
Chae

(10) Patent No.: US 11,143,156 B2
(45) Date of Patent: Oct. 12, 2021

(54) ARTIFICIAL INTELLIGENCE APPARATUS FOR CONTROLLING AUTO STOP SYSTEM BASED ON TRAFFIC INFORMATION AND METHOD FOR THE SAME

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 16/486,135

(22) PCT Filed: Mar. 11, 2019

(86) PCT No.: PCT/KR2019/002793
§ 371 (c)(1),
(2) Date: Aug. 14, 2019

(87) PCT Pub. No.: WO2020/184748
PCT Pub. Date: Sep. 17, 2020

(65) Prior Publication Data
US 2019/0360446 A1    Nov. 28, 2019

(51) Int. Cl.
*F02N 11/08* (2006.01)
*B60W 30/17* (2020.01)
*G05D 1/00* (2006.01)

(52) U.S. Cl.
CPC ......... *F02N 11/0837* (2013.01); *B60W 30/17* (2013.01); *G05D 1/0088* (2013.01);
(Continued)

(58) Field of Classification Search
CPC ............... B60W 30/17; F02N 11/0837; F02N 2200/12; F02N 2200/125; F02N 2300/306;
(Continued)

(56) References Cited

U.S. PATENT DOCUMENTS

| 6,463,900 | B1 * | 10/2002 | Wakabayashi ... | G08G 1/096783 123/179.4 |
| 6,629,515 | B1 * | 10/2003 | Yamamoto ............ | B60W 10/06 123/179.4 |
| 8,296,030 | B2 * | 10/2012 | Luo ...................... | G08G 1/0962 701/70 |
| 2012/0010797 | A1 * | 1/2012 | Luo ...................... | G08G 1/0962 701/70 |

(Continued)

FOREIGN PATENT DOCUMENTS

JP    2006170180    6/2006
KR    1020150006744    1/2015

OTHER PUBLICATIONS

PCT International Application No. PCT/KR2019/002793, Written Opinion of the International Searching Authority dated Dec. 12, 2019, 8 pages.

*Primary Examiner* — Hung Q Nguyen
*Assistant Examiner* — Susan E Scharpf
(74) *Attorney, Agent, or Firm* — Lee, Hong, Degerman, Kang & Waimey

(57) ABSTRACT

An embodiment of the present invention provides an artificial intelligence apparatus for controlling an auto stop function, including: an input unit configured to receive at least one of image information or sound information with respect to a periphery of a vehicle; a communication unit configured to receive data from an external device; a storage unit configured to store a control model for the auto stop function; and a processor configured to: acquire input data with respect to traffic information through at least one of the input unit or the communication unit, acquire base data used for determining a control of the auto stop function from the input data, determine a control mode for the auto stop function by using the base data and the control model for the auto stop function, and control the auto stop function according to the determined control mode, wherein the control (Continued)

mode is one of an activation mode which activates the auto stop function or a deactivation mode which deactivates the auto stop function.

15 Claims, 9 Drawing Sheets

(52) U.S. Cl.
CPC .... *F02N 2200/12* (2013.01); *F02N 2200/125* (2013.01); *F02N 2300/306* (2013.01); *G05D 2201/02* (2013.01); *G05D 2201/0212* (2013.01); *G05D 2201/0213* (2013.01)

(58) Field of Classification Search
CPC ............. G05D 1/0088; G05D 2201/02; G05D 2201/0212; G05D 2201/0213; Y02T 10/40
See application file for complete search history.

(56) References Cited

U.S. PATENT DOCUMENTS

| | | | | |
|---|---|---|---|---|
| 2012/0029730 | A1* | 2/2012 | Nagura | F02N 11/0837 701/2 |
| 2012/0226433 | A1* | 9/2012 | Hasan | F02N 11/0837 701/112 |
| 2013/0035839 | A1* | 2/2013 | Otanez | F02N 11/0837 701/102 |
| 2013/0124066 | A1* | 5/2013 | Pebley | F02D 29/02 701/102 |
| 2015/0019114 | A1* | 1/2015 | Jang | F02N 11/0837 701/113 |
| 2015/0105999 | A1* | 4/2015 | Sangameswaran | F02D 17/00 701/112 |
| 2016/0305388 | A1* | 10/2016 | Miller | F02N 11/0818 |
| 2017/0120906 | A1* | 5/2017 | Penilla | G06Q 50/06 |
| 2018/0300556 | A1* | 10/2018 | Varerkar | G06N 3/0445 |
| 2018/0372053 | A1* | 12/2018 | Kuretake | G07C 5/0816 |
| 2020/0064848 | A1* | 2/2020 | Dudar | B60W 30/18 |

* cited by examiner

FIG. 8

| Pattern | Current section information | Future section information | Signal information | Number of nearby vehicles | Interval between vehicles | My vehicle velocity | Nearby vehicle velocity | Activation feedback |
|---|---|---|---|---|---|---|---|---|
| Pattern 1 | | | | | | | | Satisfaction |
| Pattern 2 | | | | | | | | Dissatisfaction |
| Pattern 3 | | | | | | | | Satisfaction |
| Pattern 4 | | | | | | | | Dissatisfaction |
| ... | | | | | | | | |

FIG. 9

| Aassociative rule | Current section information | Future section information | Signal information | Number of nearby vehicles | Interval between vehicles | My vehicle velocity | Nearby vehicle velocity | Whether or not to be activated |
|---|---|---|---|---|---|---|---|---|
| Aassociative rule 1 | ///  | | | | | /// | | ⟲ |
| Aassociative rule 2 | /// | /// | | /// | /// | | /// | ⟲ |
| Aassociative rule 3 | /// | /// | /// | | | | /// | Ⓐ |
| Aassociative rule 4 | /// | | | /// | /// | | | Ⓐ |
| ... | | | | | | | | |

Ⓐ Activation mode
⟲ Deactivation mode

ARTIFICIAL INTELLIGENCE APPARATUS FOR CONTROLLING AUTO STOP SYSTEM BASED ON TRAFFIC INFORMATION AND METHOD FOR THE SAME

CROSS-REFERENCE TO RELATED APPLICATIONS

This application is the National Stage filing under 35 U.S.C. 371 of International Application No. PCT/KR2019/002793, filed on Mar. 11, 2019, the contents of which are hereby incorporated by reference herein in its entirety.

TECHNICAL FIELD

The present invention relates to an artificial intelligence apparatus and a method for the same. Particularly, the present invention relates to an artificial intelligence apparatus and method for determining whether an auto stop system mounted on a vehicle is activated based on traffic information to control the auto stop system.

BACKGROUND ART

An auto stop system or an idle stop & go system is a system mounted on a vehicle, which stops an engine when the vehicle is stopped.

In the case in which the auto stop system is mounted on the vehicle, there is an effect of reducing fuel waste and pollution caused by engine idling occurring when the vehicle is stopped. Also, since an engine idling sound is not generated when the vehicle is stopped, it may be possible to well listen to the outside sound of the vehicle, thereby effectively preventing safety accidents that occurs due to other vehicles or persons outside the vehicle from occurring.

However, when applying an engine stop rule according to the same existing auto stop system in all situations, a driving state and a stopping state of the engine are repeated in a short cycle in a section in which the vehicle is frequently stopped, such as a vehicle congestion section. In this case, there is a problem that fuel efficiency is worse than the case in which the auto stop system is not applied, and also, driver's fatigue increases.

PRIOR ART DOCUMENT

Patent Document (Patent Document 1) Korean Patent Registration No. 10-1628399

DISCLOSURE OF THE INVENTION

Technical Problem

The present invention is to provide an artificial intelligence apparatus for controlling an auto stop system, which controls a control mode of the auto stop system mounted on a vehicle on the basis of traffic information indicating a current driving situation of the vehicle to prevent the auto stop system from indiscriminately operating and effectively control the auto stop system, and a method for the same.

Also, the present invention is to provide an artificial intelligence apparatus for controlling an auto stop system, which controls the auto stop system with higher accuracy in consideration of traffic information including various factors, and a method for the same.

Also, the present invention is to provide an artificial intelligence apparatus for controlling an auto stop system, which is capable of controlling the auto stop system that is personalized for each user in consideration of user's feedback on a determined control mode, and a method for the same.

Technical Solution

The present invention provides an artificial intelligence apparatus, which collects traffic information indicating a current driving situation of a vehicle and determines a control mode for the auto stop system mounted on the vehicle that is suitable for the current situation by using the collected traffic information to control the auto stop system according to the determined control mode, and a method for the same.

Also, the present invention provides an artificial intelligence apparatus, which determines a control mode for an auto stop system by using artificial neural network-based control model that is learned by using training data labeled as the control mode of the auto stop system suitable for a given vehicle's driving situation to control the auto stop system according to the determined control mode, and a method for the same.

Also, the present invention provides an artificial intelligence apparatus, which acquires feedback of a user with respect to a determined control mode to generate training data for updating, which is used to update the control model for the auto stop system, uses the control model for the auto stop system, which is updated using the training data for updating, to determine the control mode for the auto stop system, and controls the auto stop system according to the determined control mode.

Advantageous Effects

According to the various embodiments of the present invention, the control mode for the auto top system may be determined and controlled based on the traffic information to prevent the auto stop system from being indiscreetly driven, thereby reducing the fatigue of the user, improving the fuel efficiency, and solving the departure delay of the vehicle.

In addition, according to the various embodiments of the present invention, the artificial neural network-based control model may be used to more accurately control the auto stop system while reflecting the factors for various traffic information.

Also, according to the various embodiments of the present invention, the user's satisfaction or preference with respect to the control mode for the auto stop system determined by the control model and determines the control mode by using the control model for the auto stop system that is updated by reflecting the user's satisfaction or preference to control the individualized auto stop system with the high satisfaction for each user.

BRIEF DESCRIPTION OF THE DRAWINGS

FIG. 8 is a view illustrating an example of a format of data used for an associative rule analysis according to an embodiment of the present invention.

FIG. 9 is a view illustrating an example of an associative rule generated depending on the associative rule analysis according to an embodiment of the present invention.

MODE FOR CARRYING OUT THE INVENTION

Figure 1:
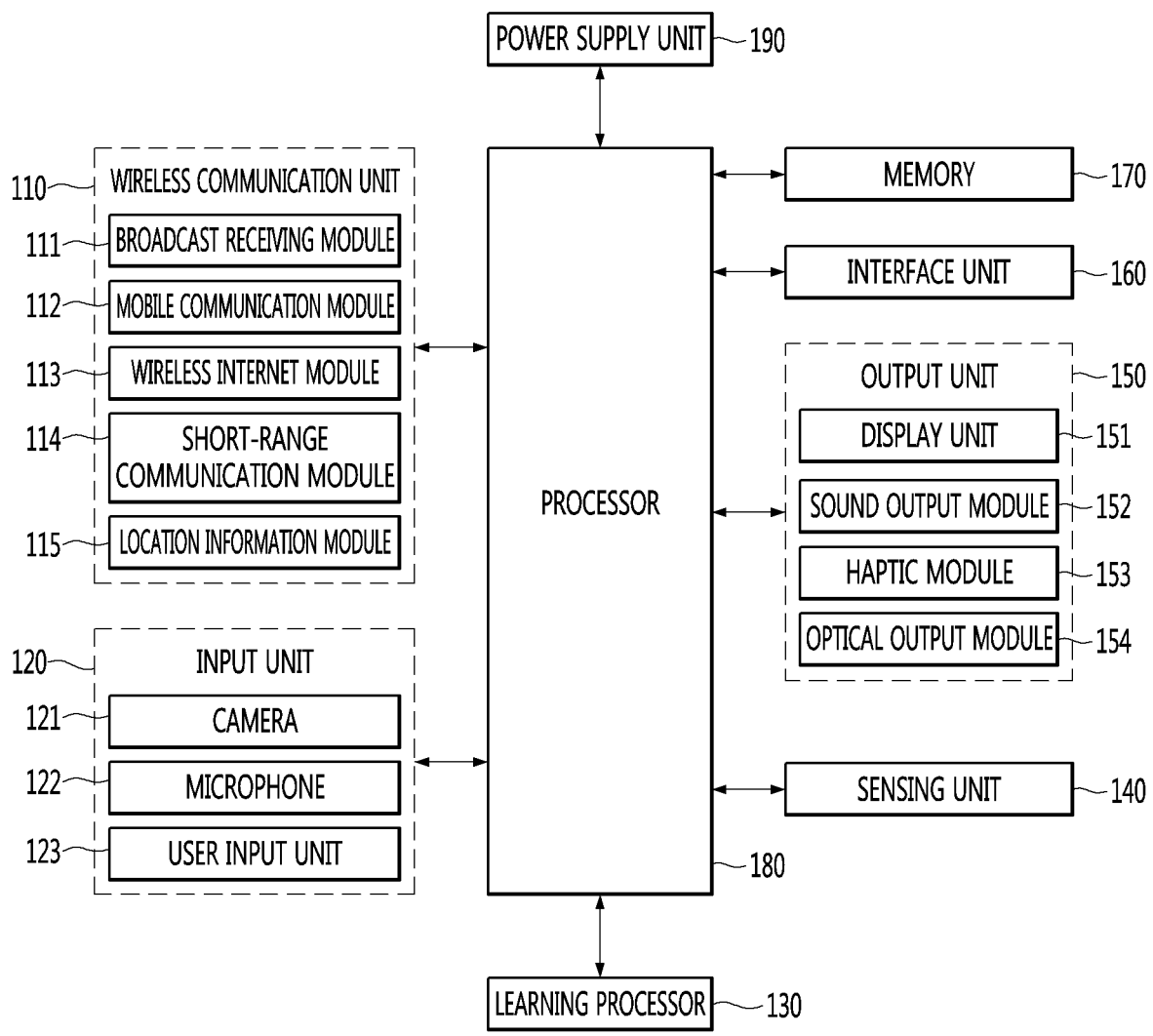
FIG. 1 is a block diagram illustrating a configuration of a control device 100 for an auto stop system according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning". In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Hereinafter, the control of the auto stop system may be understood as controlling the auto stop function. Thus, the control device for the auto stop system and the control device for the auto stop function may be commonly used in the same meaning, and the control method for the auto stop system and the control method for the auto stop function may be commonly used in the same meaning.

Also, the control model for the auto stop system and the control model for the auto stop function may be commonly used in the same meaning.

FIG. 1 is a block diagram illustrating a configuration of the control device 100 for the auto stop system according to an embodiment of the present invention.

Hereinafter, the control device 100 for the auto stop system may be called a terminal 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

Particularly, the terminal 100 may be implemented as a navigation and multimedia device mounted on the vehicle. Furthermore, the terminal 100 may be implemented as an apparatus connected to an electronic control unit (ECU) of the vehicle or including an electronic control unit.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model provided as the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
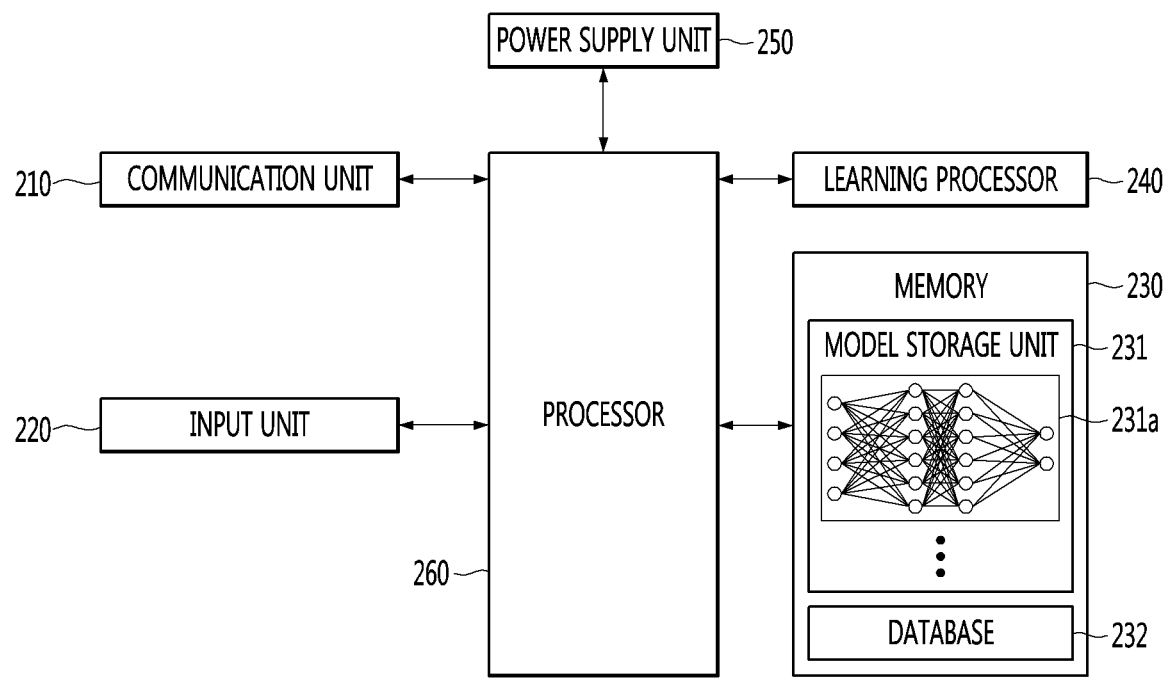
FIG. 2 is a block diagram illustrating a configuration of a learning device 200 of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
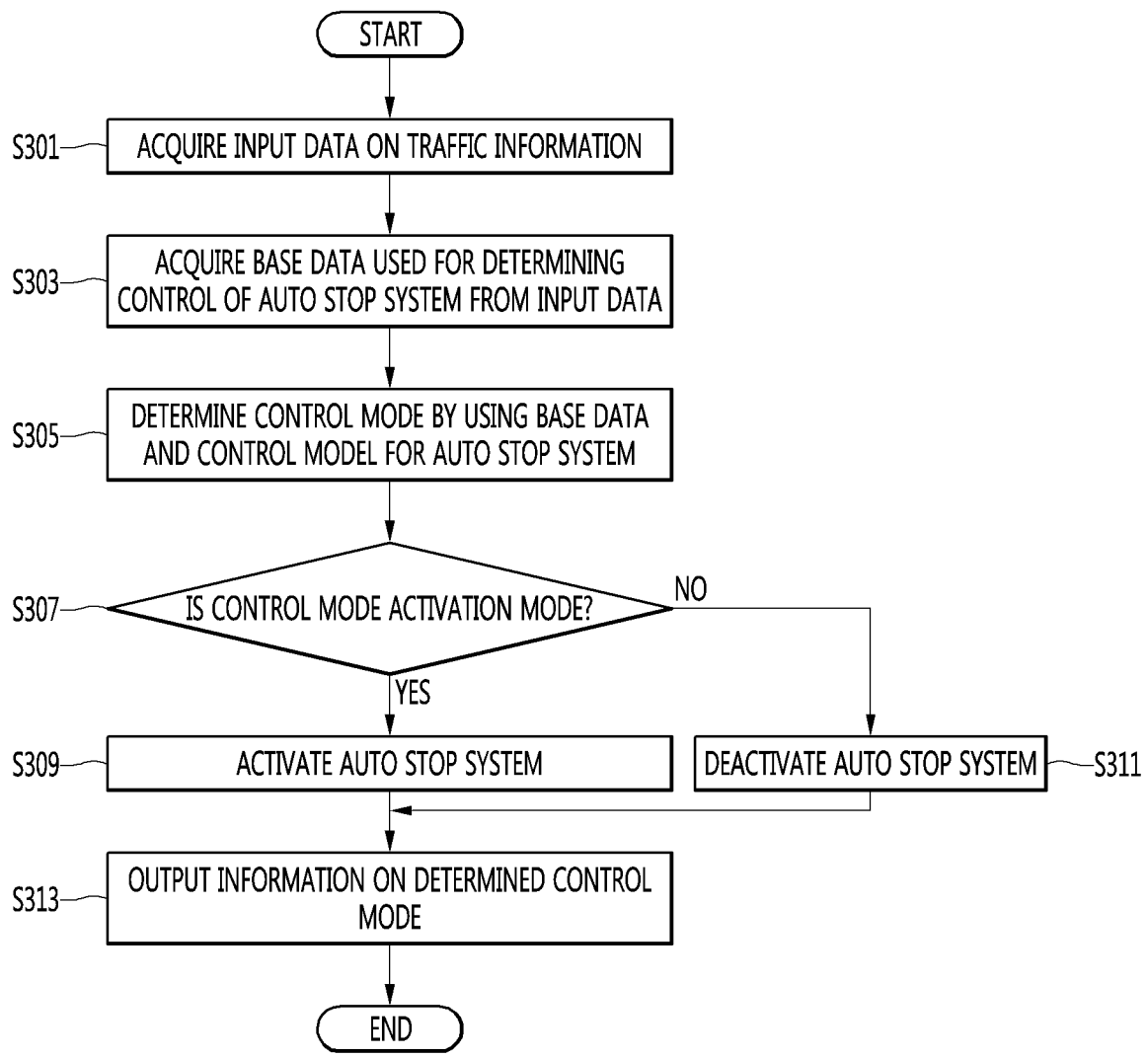
FIG. 3 is a flowchart illustrating a method for controlling the auto stop system according to an embodiment of the present invention.

FIG. 3 is a flowchart illustrating a method for controlling an auto stop system according to an embodiment of the present invention.

Referring to FIG. 3, the processor 180 of the control device 100 for the auto stop system according to an embodiment of the present invention acquires input data about traffic information through at least one or more of the wireless communication unit 110, the input unit 120 or the interface unit 160 (S301).

Hereinafter, the wireless communication unit 110 and the interface unit 160 may be collectively referred to as a communication unit.

Here, the input data on the traffic information may include traffic volume information, signal information, nearby vehicle information, peripheral environment information, image information (vision information), sound information, and current driving information of the vehicle.

Here, the acquiring of the input data through the wireless communication unit 110 may mean receiving of data collected and transmitted by devices such as a navigation device and a black box device provided in the vehicle or data transmitted from other vehicles or traffic data management device through the wireless communication unit 110.

Here, the traffic data management device may include a traffic data server or a navigation server for processing traffic-related data and may include various structures such as a signal light, a signal controller, and a beacon having communication functions to allow the traffic-related data to communicate with other devices.

For example, in a case where the signal light (smart signal or the like) having the communication function collects vehicle information on the road to transmit traffic volume information to nearby vehicles or transmit signal change information, etc., the traffic data management device may mean the signals.

Here, the acquiring of the input data through the interface unit 160 may mean receiving of data collected through the interface unit 160 such as the navigation device or the black box device provided in the vehicle.

Here, the nearby vehicle information acquired through the wireless communication unit 110 or the interface unit 160 may be vehicle information transmitted directly by other nearby vehicles.

Here, the processor 180 may receive the vehicle information directly from other nearby vehicles through the inter-vehicle communication through the wireless communication unit 110 or receive the vehicle information received from other nearby vehicles by the navigation device or the like connected through the interface unit 160 from the navigation device or the like, which is connected thereto.

That is, the processor 180 may acquire vehicle information from another vehicle through inter-vehicle communication using the wireless communication unit 110 and may acquire vehicle information about other vehicles collected directly by the traffic data management device or vehicle information, which is collected from information of other vehicles, from the traffic data management device by using the wireless communication unit 110.

Here, the input unit 120 may acquire video information around the vehicle through the camera 121 and acquire sound information around the vehicle through the microphone 122.

At least one or more cameras 121 may be provided to acquire at least one or more image information from the front, rear, or side of the vehicle, as occasion demands. For example, a front camera for illuminating the front of the vehicle and a rear camera for illuminating the rear of the vehicle, or a panoramic camera for illuminating all directions of 360 degrees.

The camera 121 may include an infrared region sensor as well as a visible ray region sensor and may acquire infrared ray image information as well as visible ray image information.

The processor 180 may use the visible light image information in the daytime and the infrared image information in the nighttime, but may use both of the image information without distinguishing between daytime and nighttime. For example, it may be possible to collect all the information acquired from the two pieces of image information or to use only the information acquired from the image information which is highly reliable in the two pieces of image information.

The camera 121 may include a depth sensor to acquire image information including depth information.

The microphone 121 may acquire sound information in a non-audible frequency range as well as sound information in an audible frequency range. For example, the sound information in the non-audible frequency range may include ultrasound.

The collected image information and sound information may be used to acquire the traffic volume information, the signal information and the peripheral environment information. The peripheral environment information may include information about the number of peripheral objects, a type of peripheral objects, a location of peripheral objects, and motion of the peripheral object.

The motion information of the peripheral objects may be acquired by analyzing the Doppler effect of the sound information or by analyzing the depth information of the image information.

Here, the traffic volume information, the signal information, the nearby vehicle information, and the peripheral traffic volume information may be acquired from other devices in a processed state, but at least one or more of the collected image information or sound information may be analyzed and acquired.

For example, the processor 180 may analyze at least one or more of the image information or the sound information to determine the number of nearby vehicles, locations of the nearby vehicles, the motion of the nearby vehicles, the driving state of the nearby vehicles (e.g., whether the brake light is turned on, whether the turn signal light is turned on, whether the emergency light is turned on), the lighting state of the peripheral signal lights, the number of peripheral objects, the location of peripheral objects, and the motion of peripheral objects.

The processor 180 of the control device 100 for the auto stop system acquires base data used for determining the control of the auto stop system from the input data (S303).

The base data is data used for determining whether the auto stop system is activated and may include at least one or more of the traffic volume information, the signal information, the peripheral environment information, and the driving information. Thus, the base data may be data processed from the collected input data.

Here, the traffic volume information included in the base data may be a section having a predetermined distance (for example, 50 meters, 100 meters, etc.) from a current moving line from the current position or may be a section from the current position to the signal light having the predetermined number (e.g., one, two, etc.). That is, the traffic volume information section may be a section from the current position to 100 meters in the moving line or a section from the current position to the next signal light, and the like.

Here, the traffic volume information included in the base data may be composed of traffic volume information corresponding to a plurality of sections. That is, the base data may include respective two or more pieces of traffic volume information in two or more sections.

For example, if it is assumed that the first section is a section from the current position to a front 50 meters (or just after the signal light) on the moving line, and a second section is a section from a forward 50 meters (or just after the signal light), the base data may include traffic volume information corresponding to the first section and traffic volume information corresponding to the second section.

Here, the base data may include information on how each section is set as a reference. For example, information indicating whether the section is divided based on the distance, or whether the section is divided based on the position of the signal light may be included in the base data.

Here, base data may be included in place of the distance information of the section by acquiring the distance information to the corresponding signal light even if each section is divided by the position of the signal light.

For example, the base data may include the distance information of a specific section when dividing the section based on the distance and may include the distance information to the position of the target signal even when dividing the section based on the position of the signal light.

Thus, there is an advantage in that the base data of the same unit is set even when the section is set.

Tables 1 and 2 below show examples of the base data, and each column represents the base data for independent states. A detailed description of each item will be described later with reference to FIG. 2.

TABLE 1

|  | Base data 1 | Base data 2 | Base data 3 |
|---|---|---|---|
| Section | 50 m | 30 m | 25 m |
| Traffic volume information (0~1) | Smoothness (0) | Slowness (0.5) | 0.7 |
| Whether green light is turned on (0 or 1) | 1 | 0 | 1 |
| Turn-on remaining time | 20 s | 10 s | 15 s |
| Front vehicle distance | 40 m | 20 m | 15 m |
| Whether front vehicle brake light is turned on (0 or 1) | 0 | 1 | 1 |
| Driving velocity | 30 km/h | 10 km/h | 5 km/h |

TABLE 2

|  | Base data 4 | Base data 5 | Base data 6 |
|---|---|---|---|
| Section 1 | 10 m | 30 m | 25 m |
| Traffic information in section 1 (0~1) | Smoothness (0) | Congestion (1) | 0.7 |
| Whether green light is turned on in section 1 (0 or 1) | 1 | 0 | 1 |
| Turn-on remaining time in section 1 | 20 s | 10 s | 15 s |
| Section 2 | 40 m | 50 m | 50 m |
| Traffic volume information in section 2 | Slowness (0.5) | Slowness (0.5) | 0.3 |
| Whether green light is turned on in section (0 or 1) | 0 | 1 | 0 |
| Turn-on remaining time in section 2 | 30 s | 10 s | 10 s |
| Front vehicle distance | 40 m | 20 m | 15 m |
| Whether front vehicle brake light is turned on (0 or 1) | 0 | 0 | 1 |
| Driving velocity | 20 km/h | 15 km/h | 35 km/h |

The base data may be processed and expressed as numerical values as shown in Table 1 and Table 2 in order to be used for determining the control of the auto stop system. That is, when the information included in the base data is clearly expressed in numerical values such as the distance and time, it may be expressed according to a predetermined unit (for example, a unit of the distance is meter, and a unit of the time is second). When the units are not provided such as whether the light is turned on or the traffic volume, the information may be expressed as a value between 0 and 1 according to the predetermined standard.

The processor 180 of the control device for the auto stop system determines a control mode for the auto stop system by using the base data and the control model for the auto stop system (S305).

As described above, the auto stop system may be intended to improve the fuel efficiency and reduce the driver's fatigue by stopping the engine when the vehicle is stopped. However, if the engine is stopped whenever the engine is stopped without considering the traffic situation, the driver's fatigue may further increase in the vehicle stagnation zone and the fuel economy may be further deteriorated. Thus, in the present invention, the control mode for the auto stop system may be determined using the base data, and the activation state of the auto stop system may be controlled accordingly.

Here, the control mode may be any one of an activation mode for activating the auto stop function or a deactivation mode for deactivating the auto stop function.

Here, the control model for the auto stop system may mean either a rule-based control model for the base data or an artificial neural network-based control model learned by the machine learning algorithm.

Here, the control model for the auto stop system may mean an associative rule-based control model corresponding to the base data.

Here, the associative rule-based control model may be understood as a sub-concept of the rule-based control model, but it may be grasped as a separate concept.

Here, the rule-based control model, the artificial neural network-based control model, and the associative rule-based control model may be stored in the memory 170 of the control device 100 for the auto stop system.

Here, the artificial neural network-based control model stored in the memory 170 may be learned and stored through the learning processor 130 of the control device 100 for the auto stop system and may be stored in the learning processor 240 of the learning device 200 of the artificial neural network and then be received through the wireless communication unit 110 so as to be stored.

Here, the processor 180 may periodically transmit update information of the artificial neural network-based control model to the learning device 200 of the artificial neural network by arrival of a set update time point, a user's request, or a request of the learning device 200 of the artificial neural network. Also, the processor 180 may receive the update information of the artificial neural network-based control model in the learning device 200 of the artificial neural network and store the update information in the storage unit 170 and also may use the updated artificial neural network-based control model to determine the control mode for the auto stop system.

The rule-based control model may be a model that mechanically determines the control mode for the auto stop system according to the preset conditions or rules for each data item included in the base data.

Here, the rule-based control model may be a model for determining the control mode for the auto stop system based on the score of each data item by giving a score according to whether predetermined conditions are satisfied for each data item included in the base data.

Here, the processor 180 may determine the control mode for the auto stop system in consideration of at least one or more of a score based on the traffic volume information, a score according to the section distance, a score according to whether the green light is turned on, a score according to the lighting remaining time a score according to the front vehicle distance, a score according to whether the brake light of the front vehicle is turned on by using the rule-based control model.

For example, the processor 180 may give a score of 0 according to the traffic volume information because the current traffic volume is smooth and give a score of 1 according to whether the green light is turned on. Also, the processor 180 may give a score of 0 according to whether the green light is turned on because the front vehicle brake is not turned on. Thus, the control mode for the auto stop system may be determined as the activation mode or the deactivation mode depending on whether these scores exceed a preset reference value by adding and combining these scores.

Here, if the added and combined score exceeds the reference value, when the control mode for the auto stop system is determined as the deactivation mode, the weight of the score according to the traffic volume information, the weight of the score according to whether the green light is turned on, and the weight of the score according to whether the front vehicle brake is turned on may be set to positive numbers, and the weight of the score according to the front vehicle distance and the weight of the score according to the remaining time of the turn-on may be set to negative numbers. However, this is merely an example, and the sign of the weight for each score may be set variously according to the practice.

The associative rule-based control model may mean a model generated by an associative rule analysis technique that analyzes a correlation between the base data corresponding to the traffic information and the control mode of the auto stop system.

The associative rule may be a useful pattern expressed by a condition-result expression between items of data. The associative rule analysis may be a method of finding a relation between items included in an event and may be divided into a process of finding a frequent item set, which is a set of items having event support higher than a minimum support and a process of generating an associative rule therefrom. In this specification, a general description of associative rule analysis will be omitted.

The associative rules may be generated by analyzing distribution of traffic information by items and by identifying frequency of coincidence for each type.

The associative rule-based control model may mean associative rules according to associative rule analysis.

The artificial neural network-based control model may be a model composed of the artificial neural networks that are learned to infer the control mode for an auto stop system as target feature points (or output feature points) by using the training data of the same format as the base data as the input data.

Here, in the training data used for the learning of the artificial neural network-based control model, the control mode for the auto stop system may be labeled so that the artificial neural network-based control model is learned by supervised learning by using the labeled training data.

For example, the training data may include information on a given environment and information on the control mode for the auto stop system that is suitable for the environment, and the artificial neural network-based control model may be learned from the driving information for a given environment to accurately infer the control mode of the labeled auto stop system.

In this case, a loss function (cost function) of the artificial neural network-based control model may be expressed as a square mean of a difference between the label of the control mode for the auto stop system corresponding to each training data and the control mode for the auto stop system inferred from each training data. Also, the model parameters included in the artificial neural network may be determined to minimize the cost function through the learning of the artificial neural network-based control model.

That is, the artificial neural network-based control model may be an artificial neural network model that is learned by the supervised learning by using the training data including the traffic information for training and the labeled control mode corresponding to the driving information for training, and when the input feature vector is inputted to the artificial neural network-based control model where the input feature vector is extracted from the traffic information for learning, the artificial neural network-based control model may output an inferred result with respect to the control mode may be outputted as a target feature vector to minimize a loss function corresponding to a difference between the outputted control mode and the labeled control mode.

Here, the target feature point of the artificial neural network-based control model may be composed of a single node output layer representing the control mode for the auto stop system. The target feature point is set to "1" when the activation mode is indicated and set to "0" when the deactivation mode is indicated. In this case, the output layer of the artificial neural network-based control model may use sigmoid, hyperbolic tangent (tanh), etc. as an activation function.

Here, the target feature point of the artificial neural network-based control model may be composed of an output layer of two output nodes indicating the control mode for the auto stop system, and each output node may indicate whether the output mode is in the activation mode or in the deactivation mode. That is, the target feature point (target feature vector) may be composed of '(whether to be activated or deactivated'), and "(1, 0)" as the value when the target feature point indicates the activation mode, and "(0, 1)" as the value when indicating the deactivation mode. In this case, the output layer of the artificial neural network-based control model may use soft max as an activation function.

Table 3 below shows an example of the training data used for the learning of the artificial neural network-based control model.

TABLE 3

|  | Training data 1 | Training data 2 | Training data 3 |
| --- | --- | --- | --- |
| Section | 30 m | 30 m | 25 m |
| Traffic volume information (0~1) | Smoothness (0) | 0.3 | 0.6 |
| Whether green light is turned on (0 or 1) | 0 | 1 | 1 |
| Turn-on remaining time | 10 s | 10 s | 30 s |
| Front vehicle distance | 30 m | 25 m | 10 m |
| Whether front vehicle brake light is turned on (0 or 1) | 0 | 1 | 0 |
| Driving velocity | 30 km/h | 10 km/h | 5 km/h |
| Control mode (0 or 1) | 1 | 1 | 0 |

Here, the processor 180 may use the artificial neural network-based control model to acquire the target feature point inferring the control mode for the auto stop system by using the base data as the input data and determine the control mode for the auto stop system according to the acquired target feature point.

For example, the processor 180 may input the base data into the learned neural network-based control model and acquire a scalar between 0 and 1 for the control mode or a 2 dimensional vector of which each element is a scalar between 0 and 1 as its output, thereby determining whether to be in the activation mode or the deactivation mode.

Here, the processor 180 may extract the feature vector to use the base data as the input data of the artificial neural network-based control model. However, since the base data acquired in step S303 is a feature vector extracted to be used as the input data of an artificial neural network-based control model in fact, it is not necessary to extract a separate feature vector.

That is, in step S303, the process of representing the non-digitized information by acquiring numerical information when acquiring the base data and normalizing and representing the digitized information may be a feature point extraction process to be used as the input data of the artificial neural network-based control model.

Particularly, the processor 180 may control to deactivate the auto stop system irrespective of the result of the rule-based control model or the artificial neural network-based control model when the current driving mode of the vehicle is the performance center mode (e.g., sports mode). In this regard, it may be seen that the processor 180 uses both the artificial neural network-based control model and a rule-based control model.

Alternatively, the control mode may be determined so that the auto stop system is deactivated when the current driving modes of all the rule-based control model and the artificial neural network-based control model are the performance center mode. That is, in this point of view, it is possible to determine that the auto stop system is deactivated when the driving mode of the current vehicle is inputted in the control model for the auto stop system control, the driving mode may be the performance center mode in the model.

The processor 180 of the control device 100 of the auto stop system determines whether the determined control mode is the activation mode (S307).

If it is determined in step S307 that the determined control mode is the activation mode, the processor 180 activates the auto stop system (S309).

The activation of the auto stop system means that an engine is stopped when the vehicle is stopped by pressing the brake pedal even if the engine is in a starting state, and the engine operates when the brake pedal is released in the stopped state or when the accelerator pedal is depressed.

Here, if the processor 180 is an electronic control unit of the vehicle, the processor 180 may directly control to activate the auto stop system.

Here, when the processor 180 is configured separately from the electronic control unit of the vehicle, the processor 180 may transmit a control signal for activating the auto stop system to the electronic control unit of the vehicle through the wireless communication unit 110 or the interface unit 160.

If it is determined in step S307 that the determined control mode is the deactivation mode, the processor 180 deactivates the auto stop system (S311).

The fact that the auto stop system is deactivated means that the activity of the auto stop system is restricted in the vehicle equipped with the auto stop system.

Here, if the processor 180 is an electronic control unit of the vehicle, the processor 180 may directly control to deactivate the auto stop system.

Here, when the processor 180 is configured separately from the electronic control unit of the vehicle, the processor 180 may transmit a control signal for deactivating the auto stop system to the electronic control unit of the vehicle through the wireless communication unit 110 or the interface unit 160.

The processor 180 of the control device 100 for the auto stop system outputs information on the determined control mode (S313).

Here, the processor 180 may output information regarding the determined control mode through the output unit 150.

Here, the processor 180 may output information indicating the current control mode or information indicating a change in the control mode through the output unit 150.

For example, the processor 180 may control the display unit 151 to visualize the information indicating the current control mode or the information indicating the change of the control mode to output information as a message or an icon. Also, the processor 180 may control the sound output unit 152 to audibly inform information (current control state information) indicating the current control mode or information indicating a change in the control mode (control state change information). Here, the voice may include a pre-recorded guide voice or a mechanically synthesized voice.

Here, the processor 180 may acquire feedback information for the determined control mode of the user through the input unit 120.

Here, the processor 180 may not only acquire a response that the user has unconsciously determined for the determined control mode as feedback information as well as a case where the user utters the feedback voice for the control mode intentionally determined or presses a feedback button to provide the feedback information.

For example, evaluation information about the control mode inputted through voice such as "the present determined control mode is not satisfied", which is unconsciously uttered for the feedback by the user or a touchable display or button and a voice of the complaint (sigh) or the voice of satisfaction (whoop) which the user unconsciously uttered may be collected as the feedback information.

Here, the collected feedback information may be used to update only the current personalized artificial neural network-based control model.

Here, the collected feedback information may be used as labeling information for the control mode.

Here, the processor 180 may store the feedback information and the base data corresponding to the feedback information in a memory 170 in pairs.

The stored base data and feedback information pair may be used to update the artificial neural network-based control model through the learning processor 130 or the learning processor 240 of the learning device 200 of the artificial neural network.

As described above, since the control mode is determined using the updated control model for the auto stop system by reflecting the user's satisfaction or preference, it is possible to control the individualized auto stop system with high satisfaction for each user.

According to the present invention, the user may receive the auto stop system adequate for the current driving situation. Thus, this makes it possible to effectively solve the problem that the user's fatigue due to the operation of the auto stop system improperly increases, the fuel consumption is deteriorated, and the delay in departure after the stopping.

Figure 4:
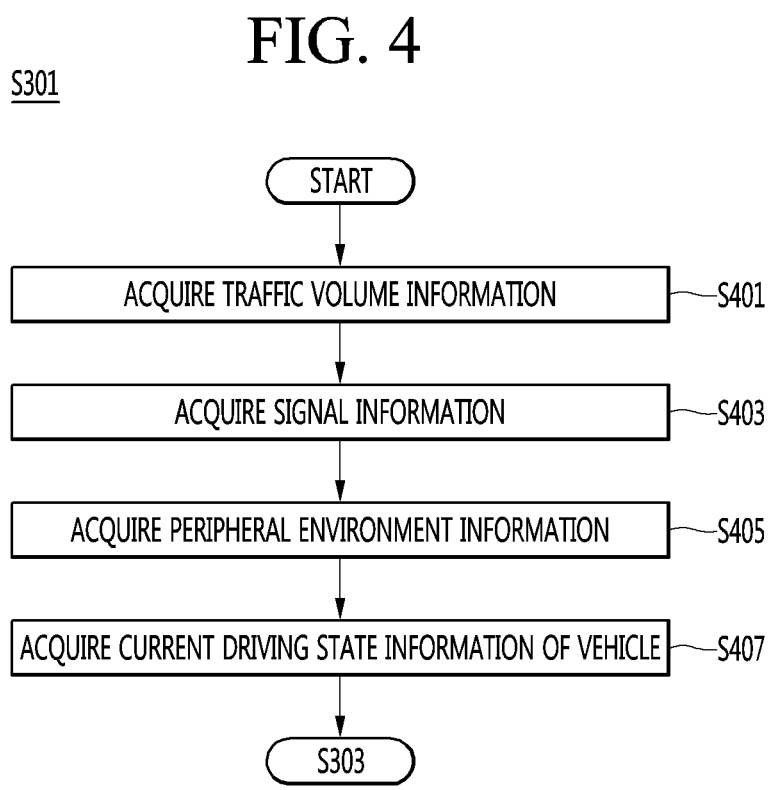
FIG. 4 is an operation flowchart illustrating an example of a step S301 of acquiring input data related to traffic information illustrated in FIG. 3.

FIG. 4 is an operation flowchart illustrating an example of a step S301 of acquiring input data related to traffic information illustrated in FIG. 3.

Referring to FIG. 4, the processor 180 acquires traffic volume information through at least one or more of the wireless communication unit 110, the input unit 120, or the interface unit 160 (S401).

The traffic volume information may include information on the number of vehicles on the road, vehicle motion information, congestion degree information, travel time information, and the like.

Here, the traffic volume information to be acquired may be traffic volume information for the road within a predetermined radius (for example, 200 meters, etc.) from the current vehicle or traffic volume information for the road on the current driving line of the user.

The processor 180 may analyze at least one or more of the acquired image information or sound information to acquire the traffic volume information.

The processor 180 acquires signal information through at least one or more of the wireless communication unit 110, input unit 120, or the interface unit 160 (S403).

The signal information may include turn-on information of the current signal (e.g., red light, green light, etc.), signal schedule information (e.g., remaining time of the currently turned-on signal and turn-on expected time of the next green light).

The processor 180 may analyze at least one or more of the acquired image information or sound information to acquire the signal information.

The processor 180 acquires peripheral environment information 502 through at least one or more of the wireless communication unit 110, input unit 120, or the interface unit 160 (S405).

The peripheral environment information may be information on the peripheral object may include the number of peripheral objects, location information, motion information, and the like. That is, the peripheral environment information may include nearby vehicle information.

The nearby vehicle information may include the number of nearby vehicles, location information, motion information, driving information, and the like. Here, the driving information may include the nearby vehicle's moving line information, destination information, whether the brake light is turned on, whether the turn signal light is turned on, whether the emergency light is turned on, or the like.

Here, the processor 180 may analyze at least one or more of the acquired image information or sound information to acquire the peripheral environment information.

The processor 180 acquires current driving state information through at least one or more of the wireless communication unit 110, input unit 120, or the interface unit 160 (S407).

The present driving state information of the vehicle may include a speed of the vehicle, a driving mode of the vehicle, and the like. The driving mode of the vehicle may include a setting of performance of the vehicle such as whether the current vehicle is a fuel efficiency-based mode.

Here, the processor 180 may analyze at least one or more of the acquired image information or sound information to acquire the current driving state information of the vehicle.

Here, if the processor 180 is an electronic control unit of the vehicle, the processor 180 may directly acquire the current driving state information of the vehicle.

Here, when the processor 180 is configured separately from the electronic control unit of the vehicle, the processor 180 may acquire the current driving state information of the vehicle from the electronic control unit of the vehicle through the wireless communication unit 110 or the interface unit 160.

In an alternative embodiment, operations S401, S403, S405, and S407 for acquiring the input data on the traffic information may be performed in parallel to each other or performed in a different order.

Figure 5:
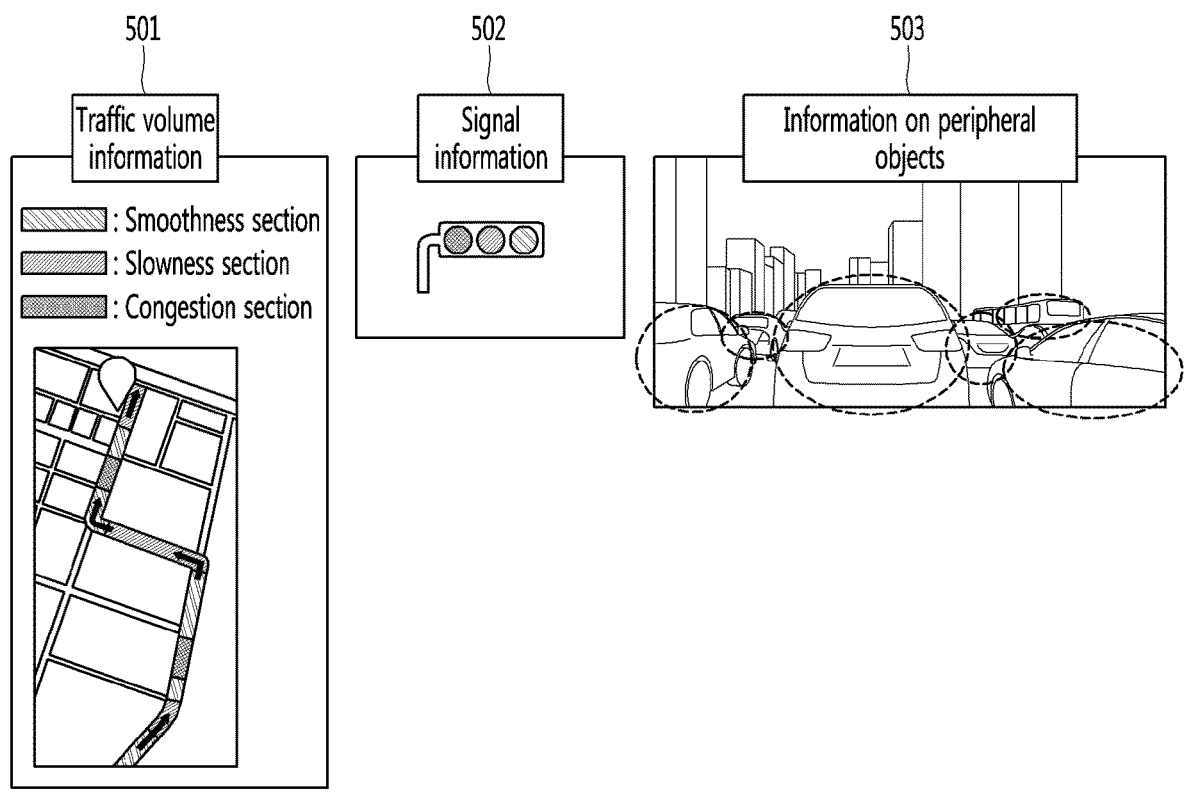
FIG. 5 is a view illustrating an example of the input data acquired according to an embodiment of the present invention.

FIG. 5 is a view illustrating an example of the input data acquired according to an embodiment of the present invention.

Referring to FIG. 5, the input data to be acquired for controlling the auto stop system may include traffic volume information 501, signal information 502, and peripheral environment information (information on peripheral objects 503).

The traffic volume information 501 may be acquired by be received from the navigation device/system as illustrated in FIG. 5 and may be acquired by analyzing at least one or more of image information and sound information.

The signal information 502 may be acquired by analyzing the video information or may be acquired by be received from another vehicle, a traffic data management device, or the like.

The peripheral environment information 503 may be acquired by analyzing at least one of the image information or the sound information and may be acquired by being received from another vehicle, a traffic data management device, or the like.

As described above, the input data may be acquired through various methods, but generally traffic volume information 501 may be acquired from the navigation device/system, and the signal information 502 and the peripheral environment information 503 may be acquired from the image information.

Figure 6:
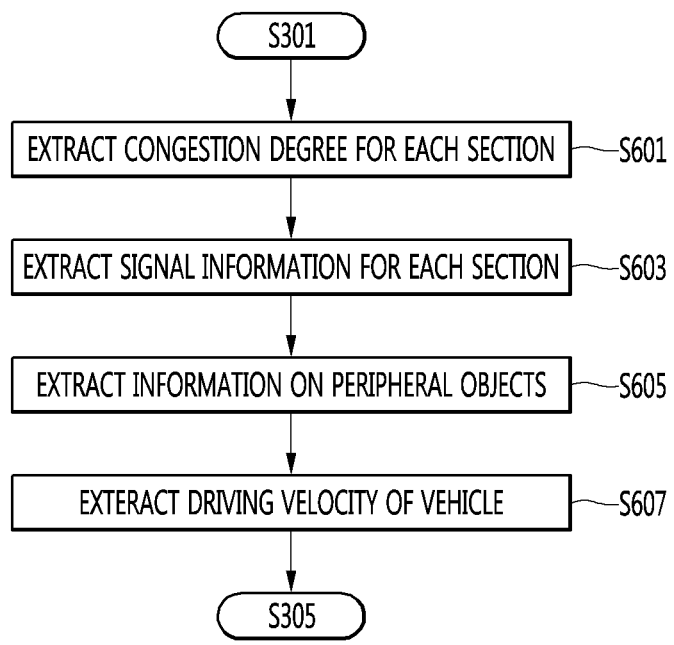
FIG. 6 is an operation flowchart illustrating an example of a step S303 of acquiring base data used for determining a control of the auto stop system from the input data illustrated in FIG. 3.

FIG. 6 is an operation flowchart illustrating an example of a step S303 of acquiring base data used for determining a control of the auto stop system from the input data illustrated in FIG. 3.

Referring to FIG. 6, the processor 180 extracts a congestion degree for each section from the input data (S601).

Here, the congestion degree for each section may be expressed as the process information and the continuous congestion degree.

The congestion degree may be expressed in three stages such as "congestion", "slowness", and "smoothness" and may be expressed as a value between 0 and 100. Furthermore, it may also be represented by a representative value for labels such as "congestion", "slowness, and "smoothness". For example, the congestion degree may be expressed as a representative value such as "congestion" expressed as a value of "100", "slowness" expressed as a value of "50", and "smooth" expressed as a value of "0".

Here, the congestion degree may be expressed as a value normalized from 0 to 1 For example, the congestion degree may be expressed as a representative value such as "congestion" expressed as a value of "1", "slowness" expressed as a value of "0.5", and "smooth" expressed as a value of "0".

The processor 180 extracts signal information for each section from the input data (S603).

Here, the signal information may mean at least one or more of signal turn-on information and signal schedule information for the signal light.

For example, the signal information may be expressed by whether the current green light of the nearest signal light included in the current driving section is turned on, whether the turn-on state changes after several seconds, or that the red light is turned on after several seconds. Whether the green light is turned on may be expressed as "1" when turned on, or "0" when turned off, and the change time of the turned on state may be expressed in seconds as the remaining time of the currently turn-on signal.

The processor 180 extracts peripheral environment information (information on peripheral objects) from the input data (S605).

Here, the peripheral environment information may include the number, position, motion information, and the like of other objects around the current vehicle.

For example, the peripheral environment information included in the base data may be expressed by the position, distance, velocity, brake, etc., of the vehicle nearest to the front, whether the brake light is turned on, or the like.

The processor 180 extracts the driving speed of the vehicle from the input data (S607).

Here, the driving velocity may be expressed in unit of km/h.

In an alternative embodiment, operations S601, S603, S605, and S607 for acquiring the base data may be performed in parallel with each other or may be performed in a different order.

Figure 7:
FIG. 7 is a view illustrating an example of a rule-based control model according to an embodiment of the present invention.

FIG. 7 is a view illustrating an example of a rule-based control model according to an embodiment of the present invention.

Referring to FIG. 7, the rule-based control model may be a model for determining the control mode of the auto stop system using the traffic volume information and the signal information.

For example, in the rule-based control model, when the traffic volume information is "congestion" or "slowness", the control mode may be set to the activation mode only when the green light is turned on and may be set to the deactivation mode only when the red light is turned on. Also, the rule-based control model may be a model for determining the control mode as the activation mode regardless of which the light is turned on when the traffic volume information corresponds to the "smoothness".

FIG. 8 is a view illustrating an example of a format of data used for an associative rule analysis according to an embodiment of the present invention.

FIG. 9 is a view illustrating an example of an associative rule generated depending on the associative rule analysis according to an embodiment of the present invention.

Referring to FIGS. 8 and 9, in one embodiment of the present invention, the data used in the associative rule analysis may include traffic information for a specific situation and control information of the auto stop system suitable for the situation.

For example, the traffic information may include current section information (current section congestion degree), future section information (later section congestion degree), signal information, number of nearby vehicles, an interval between the vehicles, a current vehicle driving velocity, and a nearby vehicle driving velocity.

Here, the traffic information used in the associative rule analysis may mean the above-described base data. Thus, items that are not represented by numerical values among the items included in the traffic information may also be numerically expressed and represented by discrete representative values (e.g., 0, 0.5, 1, etc.) or real values within a continuous range.

The control information of the auto stop system suitable for the given situation may include the control information of the auto stop system in the situation and the feedback of the user's satisfaction with the control information or the control information of the auto stop system that is corrected by reflecting the feedback of the user's satisfaction.

The associative rule generated according to the associative rule analysis may be called an associative rule-based control model. As illustrated in FIG. 9, the associative rule may be expressed as a correlation between the information on the traffic information and the information on the control mode for the auto stop system.

According to an embodiment of the present invention, the above-described method may be implemented as a processor-readable code in a medium where a program is recorded.

Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

The above-described AI apparatus is not applied to be limited to the configuration and method of the above-described embodiments and may be configured by selectively combining all or some of the embodiments so that the embodiments are variously modified.

What is claimed is:

1. An artificial intelligence apparatus for controlling an auto stop function, comprising:
    an input unit configured to receive at least one of image information or sound information with respect to a periphery of a vehicle;
    a communication unit configured to receive data from an external device;
    a storage unit configured to store a control model for the auto stop function; and
    a processor configured to:
    acquire input data with respect to traffic information through at least one of the input unit or the communication unit,
    acquire base data used for determining a control of the auto stop function from the acquired input data,
    determine a control mode for the auto stop function by using the acquired base data and the stored control model for the auto stop function, wherein the stored control model for the auto stop function corresponds to an artificial neural network-based control model that is trained by supervised learning and by using training data comprising traffic information for training and a labeled control mode corresponding to the traffic information for training and the artificial neural network-based control model is trained to minimize a loss function, and
    control the auto stop function according to the determined control mode, wherein the determined control mode is one of an activation mode which activates the auto stop function or a deactivation mode which deactivates the auto stop function.

2. The artificial intelligence apparatus according to claim 1, wherein the processor is further configured to acquire the input data with respect to the traffic information by using at least one or more of the image information or the sound information, which is acquired through at least one or more of the input unit or the communication unit.

3. The artificial intelligence apparatus according to claim 1, wherein the input data comprises at least one or more of traffic volume information, signal information, peripheral environment information, or vehicle driving state information.

4. The artificial intelligence apparatus according to claim 1, wherein the processor is further configured to:
    change information of the input data that is not represented numerically into a numerical value according to preset corresponding information, and
    normalize a value of the information represented as the numerical value so as to be expressed as a real number between 0 and 1 for acquiring the base data, wherein the value is capable of being normalized.

5. The artificial intelligence apparatus according to claim 1, wherein the base data comprises at least one or more of a congestion degree for each section, signal information for each section, peripheral object information, a vehicle driving velocity, or a vehicle driving mode.

6. The artificial intelligence apparatus according to claim 5, wherein the control model for the auto stop function is a model configured to determine the control mode as the deactivation mode when the vehicle driving mode of the base data is a performance-based mode.

7. The artificial intelligence apparatus according to claim 1, wherein the control model for the auto stop function is a rule-based control model configured to determine the control mode according to whether rules or conditions with respect to each of items of the base data are satisfied.

8. The artificial intelligence apparatus according to claim 1,
wherein, when an input feature vector is inputted to the artificial neural network-based control model where the input feature vector is extracted from the traffic information for training, the artificial neural network-based control model outputs a determined result with respect to the control mode as a target feature vector, and
the loss function corresponds to a difference between the outputted target feature vector and the labeled control mode.

9. The artificial intelligence apparatus according to claim 8, wherein the artificial neural network-based control model is further trained by using the training data through an external learning device for an artificial neural network or a learning processor that performs learning of the artificial neural network.

10. The artificial intelligence apparatus according to claim 9, wherein, if the artificial neural network-based control model is further trained by the external learning device, the processor is further configured to:
receive update information for the artificial neural network-based control model to a training device from the external learning device through the communication unit by requesting the update information, when user's request is received, a set update time point is arrived, or an update notification is received from the external learning device, and
update the artificial neural network-based control model by using the received update information.

11. The artificial intelligence apparatus according to claim 9, wherein the processor is further configured to:
acquire feedback from users with respect to the control of the auto stop function through the input unit,
generate training data for updating comprising the acquired feedback from the users and the base data, and
store the training data for updating in the storage unit or transmit the training data for updating to the external learning device through the communication unit.

12. The artificial intelligence apparatus according to claim 11, wherein the artificial neural network-based control model is further trained by additionally reflecting the training data for updating.

13. The artificial intelligence apparatus according to claim 1, further comprising an output unit comprising at least one or more of a display or a speaker,
wherein the processor is further configured to output at least one or more of current control state information of the auto stop function or changed information in the at least one or more of the current control state information of the auto stop function according to the determined control mode.

14. A control method for controlling an auto stop function, comprising:
acquiring, via a processor, input data with respect to traffic information through at least one or more of an input unit receiving at least one of image information or sound information with respect to a periphery of a vehicle or a communication unit receiving data from an external device;
acquiring, via the processor, base data used for determining a control of the auto stop function from the acquired input data;
determining, via the processor, a control mode for the auto stop function by using the acquired base data and a control model for the auto stop function, wherein the control model for the auto stop function corresponds to an artificial neural network-based control model that is trained by supervised learning and by using training data comprising traffic information for training and a labeled control mode corresponding to the traffic information for training and the artificial neural network-based control model is trained to minimize a loss function; and
controlling, via the processor, the auto stop function according to the determined control mode,
wherein the determined control mode is one of an activation mode which activates the auto stop function or a deactivation mode which deactivates the auto stop function.

15. A non-transitory recording medium in which program for performing a control method for controlling an auto stop function is recorded,
wherein the control method comprises:
acquiring, via a processor, input data with respect to traffic information through at least one or more of an input unit receiving at least one of image information or sound information with respect to a periphery of a vehicle or a communication unit receiving data from an external device;
acquiring, via the processor, base data used for determining a control of the auto stop function from the acquired input data;
determining, via the processor, a control mode for the auto stop function by using the acquired base data and a control model for the auto stop function, wherein the control model for the auto stop function corresponds to an artificial neural network-based control model that is trained by supervised learning and by using training data comprising traffic information for training and a labeled control mode corresponding to the traffic information for training and the artificial neural network-based control model is trained to minimize a loss function; and
controlling, via the processor, the auto stop function according to the determined control mode, wherein the determined control mode is one of an activation mode which activates the auto stop function or a deactivation mode which deactivates the auto stop function.

* * * * *